D. MAGGIORA.
PROCESS AND APPARATUS FOR PRODUCING BODIES UNDER TENSION TO BE USED AS TIRES FOR VEHICLE WHEELS AND THE LIKE.
APPLICATION FILED NOV. 17, 1919.

1,429,605. Patented Sept. 19, 1922.

Inventor
D. Maggiora
By H. R. Kerslake
Attorney

Patented Sept. 19, 1922.

1,429,605

UNITED STATES PATENT OFFICE.

DEMETRIO MAGGIORA, OF FLORENCE, ITALY.

PROCESS AND APPARATUS FOR PRODUCING BODIES UNDER TENSION TO BE USED AS TIRES FOR VEHICLE WHEELS AND THE LIKE.

Application filed November 17, 1919. Serial No. 338,642.

(GRANTED UNDER THE PROVISIONS OF THE ACT OF MARCH 3, 1921, 41 STAT. L., 1313.)

*To all whom it may concern:*

Be it known that I, DEMETRIO MAGGIORA, a subject of the King of Italy, and residing at Careggi, Florence, Italy, have invented certain new and useful Improvements in a Process and Apparatus for Producing Bodies Under Tension to be Used as Tires for Vehicle Wheels and the like, of which the following is a specification.

The present invention relates to a method of producing bodies under tension, to be used as tires or resilient suspension means for vehicle wheels.

Particular purpose of the invention is a practical manner for threading a rubber tube of a certain diameter upon a rigid or resilient cylinder having a diameter much greater than the bore of the said rubber tube. The two parts, properly assembled constitute a good tire for vehicle wheels, also a resilient suspension, the method of obtaining it being hereinafter described with reference to the accompanying drawing in which.

Figure 1:
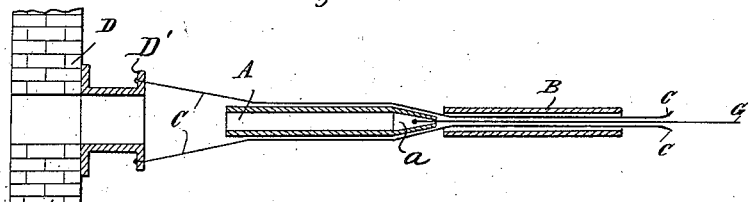
Fig. 1 shows the first step of the method, that is the enlarging of the rubber tube to the desired diameter.

Referring to the drawing in detail, in which the similar parts are indicated with the same reference characters, —A— indicates a rigid tube, provided with a detachable conic nose *a*, the inside diameter of the tube —A— being somewhat larger than the outside diameter of the body upon which the rubber tube is to be applied.

—B— is the rubber tube the bore of which is much smaller than the outside diameter of the rigid tube —A—. —C— indicates a certain number of steel cables, anchored with one of their ends to a circular support D' fixed to the wall —D—. —G— is a steel cable connected at one end to the nose —*a*— of the rigid tube —A—, and at the other end to a winch.

The parts are arranged as shown in Fig. 1.

Acting on the winch end of the cable —G—, a strong pull is exerted upon the cable and the tube —A— with the result of advancing the rigid tube —A— towards the rubber tube —B—. The tube —A— slides between the cables —C— and enters with its nose —*a*— into the rubber tube —B—. The cables —C— are so arranged that the rubber tube —B— never contacts directly with the interior of the tube —A—, as their function is to produce an initial enlarging of the rubber tube —B—.

Figure 2:
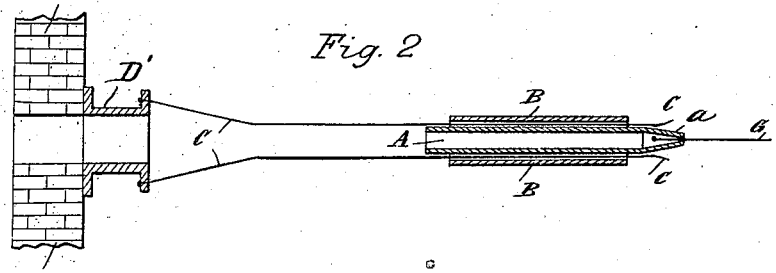
Fig. 2 shows the rubber tube, enlarged, ready to be slid upon the inner body member.

The drawing of the cable —G— is carried on until the rigid tube —A— has been completely threaded within the rubber tube —B—, as clearly shown by Fig. 2.

Figure 3:
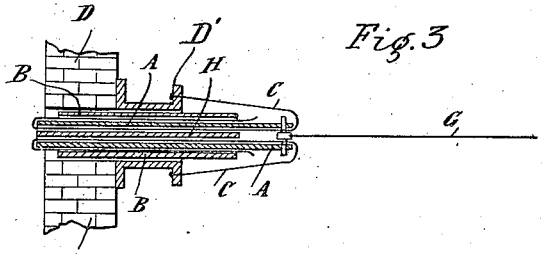
Fig. 3 shows the second step involving the insertion of the inner body member within the rigid tube, and Fig. 4 the last step of the method involving the withdrawal of the rigid tube from the rubber tube.
Figure 4:
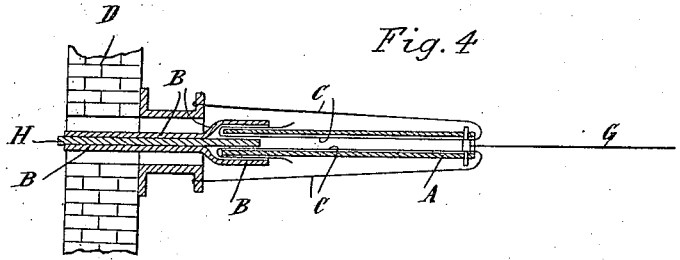

Fig. 3 shows the second phase of the process. The nose —*a*— is detached, the cables —C— are also detached from the support D' and passed through the bore of the tube —A—, then bent back and again anchored to the wall —D—. The body —H— is now slipped into the rigid tube —A—, the cables —C— lying loosely between the body and tube and the latter is held stationary while a pull is exerted upon the tube —A— by means of the cable —G—. The pull exerted upon the rigid tube —A— withdraws the latter from the rubber tube —B—, taking with it the cables —C—, thereby permitting the rubber tube —B— to contract the body —H—, which it grips. Obviously the rigid tube —A— and the cables —C— leave contemporaneously the rubber tube —B— which is thus free to close upon the body —H—. The latter may be a rubber cylinder or a cylinder of any other material according to the purpose for which the finished article is intended to serve.

Having now particularly described and ascertained the nature of my said invention and the manner to perform it, what I claim is:

1. In an apparatus for producing bodies under tension, a rigid tube provided with a tapered end for insertion in an elastic tube, means for drawing the rigid tube into an elastic tube, a body of less external diameter than the internal diameter of the rigid tube and adapted for insertion therein subsequent to the expansion of the elastic tube whereby upon removal of the rigid tube from the elastic tube, the latter contracts and grips said body.

2. In an apparatus for producing bodies under tension, a rigid tube having a tapered extremity and adapted for entry into an elastic tube, a plurality of relatively stationary and flexible guide members embracing the rigid tube adapted for insertion in a flexible tube preliminary to the entry of the rigid tube, and means for drawing the rigid tube longitudinally with respect to the guide members whereby to enter the elastic tube.

4. In an apparatus for producing bodies under tension, a rigid tube having a tapered nose at one end adapted for entry in an elastic tube, a draw member connected with the ends of the rigid tube for drawing the latter into the elastic tube, a plurality of flexible guide members embracing the rigid tube and adapted to be placed within the elastic tube preliminary to the entry of the rigid tube, and means supporting the guide members.

4. In an apparatus for producing bodies under tension, a hollow rigid tube adapted for insertion in an elastic tube, a plurality of flexible guide members embracing the rigid tube and adapted to be placed within the elastic tube to facilitate the entry of the rigid tube, a body adapted for insertion in the rigid tube subsequent to the insertion of the latter within the elastic tube, and means detachably supporting the extremities of the guide members whereby the latter, subsequent to the entry of the rigid tube into the elastic tube may be passed through the rigid tube and again attached to the supporting means to facilitate the withdrawal of the rigid tube from the elastic tube.

5. In an apparatus of the character described, a rigid tube, a detachably tapered nose carried by one end of the rigid tube adapted to facilitate entry of the latter in an elastic tube, a plurality of flexible guide members adapted to enter the elastic tube prior to the entrance of the rigid tube to guide and facilitate entry of the latter, means for drawing the rigid tube through the elastic tube, means supporting the guide members whereby upon the completion of the entry of the rigid member into the elastic tube, said guide members may be extended through the rigid tube and attached to the supporting means subsequent to the removal of the tapered nose, to facilitate withdrawal of the rigid tube from the elastic tube, and a body adapted for insertion in the rigid tube.

6. The method of producing bodies under tension consisting in expanding the body to abnormal size, and permitting the body to contract by its inherent resiliency about an internal body member.

7. A method of producing bodies under tension consisting in inserting an expanding member within the elastic body and subsequently withdrawing the expanding member of the elastic body to permit the latter to contract by its inherent elasticity about an internal body member.

In testimony whereof I have hereunto signed my name in the presence of two witnesses.

DEMETRIO MAGGIORA.

Witnesses:
MADDALENA GALLERINI,
IVEY MARTIN SMITH.